(12) United States Patent
Peacock

(10) Patent No.: US 6,470,832 B1
(45) Date of Patent: Oct. 29, 2002

(54) ANIMAL BOOTS

(76) Inventor: Charlton Peacock, 5089 Utopia Ct., Denver, CO (US) 80239

( * ) Notice: Subject to any disclaimer, the term of this patent is extended or adjusted under 35 U.S.C. 154(b) by 0 days.

(21) Appl. No.: 09/782,790

(22) Filed: Feb. 13, 2001

Related U.S. Application Data

(60) Provisional application No. 60/183,005, filed on Feb. 16, 2000.

(51) Int. Cl.$^7$ ............................................. A01K 13/00
(52) U.S. Cl. ........................................... 119/850; 54/82
(58) Field of Search ................................ 119/850, 851; D30/144–146; 54/82

(56) References Cited

U.S. PATENT DOCUMENTS

| | | | | |
|---|---|---|---|---|
| 2,424,172 A | * | 7/1947 | Huddleston | 36/111 |
| 2,446,371 A | | 8/1948 | Jones | |
| 3,747,565 A | * | 7/1973 | Kellam | 36/111 |
| 4,457,261 A | | 7/1984 | Marshall | |
| 4,458,431 A | * | 7/1984 | Sinclair | 36/88 |
| 4,633,817 A | | 1/1987 | Taylor | |
| 4,744,333 A | | 5/1988 | Taylor | |
| 5,148,657 A | * | 9/1992 | Stafford et al. | 168/1 |
| 5,408,812 A | | 4/1995 | Stark | |
| 5,452,685 A | | 9/1995 | Thomas | |
| 5,495,828 A | | 3/1996 | Solomon et al. | |
| D379,251 S | * | 5/1997 | Mezey | 36/111 |
| D382,378 S | | 8/1997 | Stark | |
| 5,676,095 A | | 10/1997 | Ralls | |
| D387,511 S | | 12/1997 | Caditz | |
| D417,530 S | * | 12/1999 | Danek | D30/146 |
| 5,996,252 A | * | 12/1999 | Cougar | 36/113 |
| 6,062,008 A | * | 5/2000 | Nor | 54/82 |
| 6,151,803 A | * | 11/2000 | Charles | 36/107 |
| 6,186,097 B1 | * | 2/2001 | Brockmann et al. | 119/850 |

FOREIGN PATENT DOCUMENTS

GB 2 264 221 A * 8/1993 ............ A43B/7/32

* cited by examiner

*Primary Examiner*—Charles T. Jordan
*Assistant Examiner*—Kimberly S. Smith
(74) *Attorney, Agent, or Firm*—Rick Martin; Patent Law Offices of Rick Martin, PC

(57) ABSTRACT

An animal boot is provided which is made from flexible metal or metalized fabric. The fabric is formed into a sleeve, which is open at both ends. The bottom end of the sleeve widens out to go over the animals paw. At the edge of the bottom end of the sleeve the fabric is formed into a fold. A flexible sole is slipped into the fold and held in place with fasteners. The top end has a strap around it for tightening the boot around the leg of the animal. The top edge can be folded down over the strap to prevent the animal from chewing at the strap. Air holes can be provided to increase airflow around the animal's foot.

12 Claims, 2 Drawing Sheets

ANIMAL BOOTS

CROSS-REFERENCE TO RELATED APPLICATION

This application is a non-provisional application claiming the benefits of provisional application No. 60/183,005 filed Feb. 16, 2000.

FIELD OF INVENTION

The present invention relates to boots for cats or other animals to prevent clawing of furniture and carpets, or for use in medical application to prevent wound licking.

BACKGROUND OF THE INVENTION

Boots for animals are well known in the art. These boots have been made for a variety of purposes. A few of the related patents are listed below:

U.S. Pat. No. 2,446,371 to Jones (1946) discloses a slip on dog boot with a roughened sole to prevent slippage.

U.S. Pat. No. 5,408,812 to Stark (1995) discloses a dog boot with a foot portion and two attachment straps.

U.S. Pat. No. 5,452,685 to Thomas (1995) discloses a dog boot with a foot portion and a single hook and loop strap made out of puncture resistant material.

U.S. Pat. No. 4,457,261 to Marshall (1984) discloses a dog boot with a foot portion and a single hook and loop strap.

U.S. Pat. No. 4,633,817 to Taylor (1987) discloses a two layer dog boots held up with garters over the animal's back.

U.S. Pat. No. 4,744,333 to Taylor (1988) discloses a one-layer dog boots held up with garters over the animal's back.

U.S. Pat. No. 5,495,828 to Soloman et al. discloses a seamless animal boot with a hook and loop strap.

U.S. Pat. No. 5,676,095 to Ralls discloses a protective covering for a cat's feet to prevent destructive behavior. The boots are made from a durable, puncture resistant material and are attached with gators.

U.S. Des. Pat. No. 379,251 to Mezey (1997) discloses an animal boot with either one or two straps.

U.S. Des. Pat. No. 387,511 to Caditz (1997) discloses an animal boot with one strap.

U.S. Des. Pat. No. 382,378 to Stark (1997) discloses an animal boot with a built in attachment.

Most of these boots are made for dogs and are designed to be worn outside while the animal is supervised. The boots are not made of a material that the animal could not chew through given the opportunity. Another problem with the known boots is that once the tread is worn away there is no way to replace the tread and new boots must be bought.

A well-known problem with domestic cats is that they often claw furniture, carpet and walls. Ralls '095 patent is an attempt to solve this problem with foot coverings. However, coverings are attached over the shoulders of the cat and are made from fabric or leather. The straps over the shoulders could easily become hooked on something as the cat moved around the house. Also, the cat could chew through the straps or the coverings when left alone.

What is needed is a boot to prevent a cat's claws from damaging a surface which are difficult for the animal chew off when the owner is not home. The boots also need to be designed so that there are minimal entanglement hazards.

The present invention solves these problems by making the boots out of metal or metalized fabric so that the animal cannot chew through that material. The top of the boot is folded down over the strap to prevent chewing the strap and to prevent catching the strap on anything.

The sole is slid into a lip formed at the bottom edge of the fabric. Snaps or other fasteners hold the sole in place.

SUMMARY OF THE INVENTION

The primary aspect of the present invention is to provide a boot to prevent a cat from damaging furniture by scratching.

Another aspect of the present invention is to provide a boot that the animal cannot remove by chewing.

Another aspect of the present invention is to provide an animal boot with a replaceable sole.

Another aspect of the present invention is to provide a boot that is easy to take on and off the animal.

Another aspect of the present invention is to provide a boot that provides plenty of airflow for the comfort of the animal.

Another aspect of the present invention is to provide a sole with texturing to prevent slippage.

Other aspects of this invention will appear from the following description and appended claims, reference being made to the accompanying drawings forming a part of this specification wherein like reference characters designate corresponding parts in the several views.

An animal boot is provided which the top portion is made from flexible metal, or metalized, fabric. Examples of flexible metal fabric include ring chain mail or plate and ring mail, such as is used in armor, meat cutters gloves and shark suits.

The foot portion is formed from a lightweight metal in the shape of the foot. The inside of the foot piece has a soft pad of rubber or other material to protect the pads of the foot. The bottom sole also has a removable rubber sole to provide traction. Attached to the foot piece is a sleeve of chain mail mesh that extends above the ankle to provide flexibility for movement and airflow. Above the mesh is a section of metal plates and rings extending the rest of the way up.

The top end has a strap around it for tightening the boot around the leg of the animal. A section chain mail is provided under the strap to allow for tightening of the bottom. The top edge can be folded down over the strap to prevent the animal from chewing at the strap. Air holes can be provided to increase airflow around the animal's foot.

In an alternate embodiment the ring fabric is formed into a sleeve, which is open at both ends. The bottom end of the sleeve widens out to go over the animals paw. At the edge of the bottom end of the sleeve the fabric is formed into a fold. A flexible sole is slipped into the fold and held in place with fasteners. The alternate embodiment attaches identically as the preferred embodiment

BRIEF DESCRIPTION OF THE DRAWINGS

FIG. 6 is a partially cut-away, side plan view of the preferred embodiment with the strap open with.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 6:
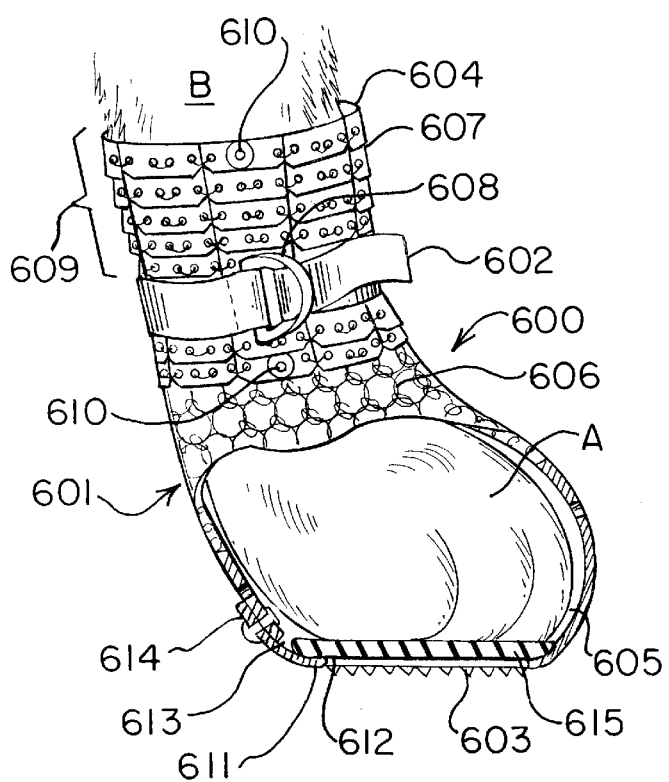
Figure 7:
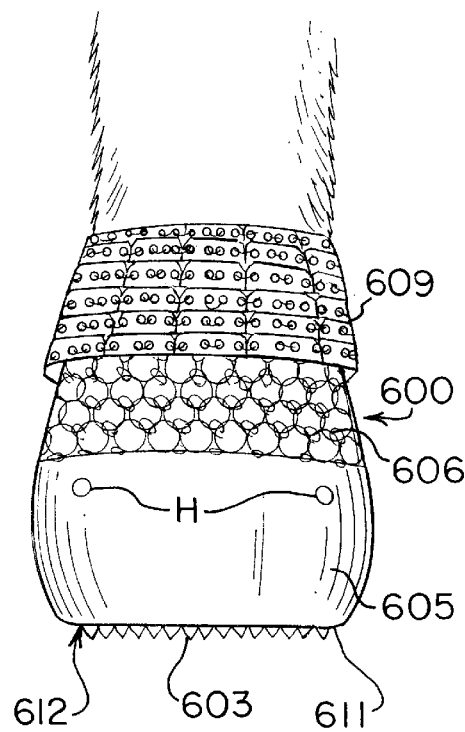
FIG. 7 is a front plan view of the preferred embodiment with the cuff folded down.

Referring to FIGS. 6 and 7 the preferred embodiment of the boot 600 has three main parts, body 601, strap 602 and sole 603. The body 601 has three sections; a foot piece 605, a middle section 606, and a top portion 607. The top end 604 is wide enough to allow the boot 600 to be slid on the cat's paw A. The foot piece 605 is formed from lightweight metal or other puncture proof material such as hard plastic. The foot piece 605 extends above the cat's toes to ensure the claws cannot be extended with the boot 600 on. Air holes H can be provided to allow for air circulation. The inside of foot piece 605 has a pad 615 to protect the foot A from rubbing on the hard surface.

Above the foot piece 605 is the middle section 606 which is formed from metal mesh or chain mail material. Teflon® (PTFE) or Kevlar® (Poly-para-phenylene terephthalamide) mesh may also provide enough durability to work. The middle section 606 allows for joint flexing and airflow around the foot. Attached to the middle section 606 is top portion 607. In the preferred embodiment the top section 606 is made from plate and ring material. The plates and rings can be made of metal, PTFE or other similar, light rigid material. Sources of plate and ring metal material include Diamond Needle Corp, 159 W. 25 St, New York, N.Y. Diamond Needle also produces chain mail material. The foot piece 605 would be formed by any of the standard metal or hard plastic shaping techniques or molding techniques.

Once the boot 600 is on, the strap 602 is used to tighten the boot 600 around the cat's leg B. Strap 602 is attached to the body 601 a given distance $d_1$ down from the top edge 604. Fastener 608 is used to fasten strap 602. The material under the strap 602 is chain mail or mesh to allow for tightening. A standard D ring buckle is shown, but any of the known adjustable fasteners for straps could be used.

Figure 1:
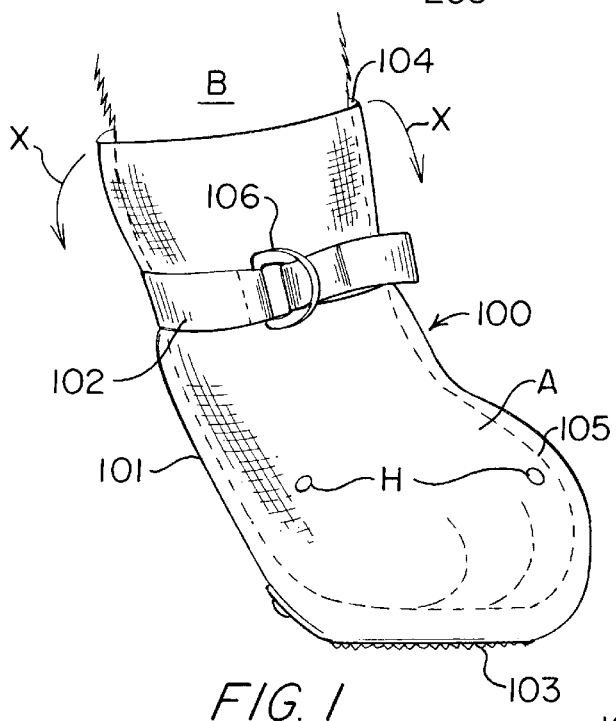
FIG. 1 is a side plan view of a first alternate embodiment with the strap fastened.

Once the strap 602 is fastened around the leg B the top edge is 604 is folded down over the strap 602 as shown in FIG. 1 with arrows X. This forms cuff 609, which covers the strap 602. Cuff 609 makes it more difficult for the animal to attempt to remove the boot 600 by chewing the strap 102. Snap 610 is provided to attach the cuff 609 to the body 601 to keep the cuff 609 down over the strap 602. Cuff 609 also reduces the risk that strap 602 could become caught on something as the cat moves around the house. reduces the risk that strap 602 could become caught on something as the cat moves around the house.

To provide for traction a sole 603 is attached to the bottom of foot piece 605. A lip 611 extends around the bottom edge of foot piece 605, forming cavity 612. At the back edge of cavity 612 is slot 613. A flexible sole 603 can be slid into cavity 612 through slot 613. The sole is made from rubber or other flexible plastic. Straps 614 hold the sole 603 in place in the cavity 612. Straps 614 can be metal attached with rings or other material such as leather or fabric.

Figure 3:
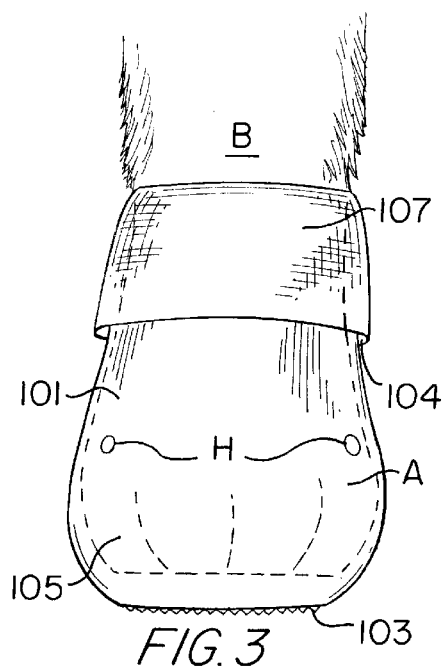
FIG. 3 is a front plan view of the first alternate embodiment with the top folded over the strap.

Referring next to FIGS. 1 and 3 the first alternate embodiment of the boot 100 has three main parts, body 101, strap 102 and sole 103. The body 101 is a sleeve open at both ends. The top end 104 is wide enough to allow the boot 100 to be slid on the cat's paw A. The bottom end 105 flares to a wider diameter to fit over the paw A when the paw A is flat on the ground. Once the boot 100 is on, the strap 102 is used to tighten the boot 100 around the cat's leg B. Strap 102 is attached to the body 101 a given distance di down from the top edge 104. Fastener 106 is used to fasten strap 102. A standard D ring buckle is shown, but any of the known fasteners for straps could be used.

Once the strap 102 is fastened around the leg B the top edge is 104 is folded down over the strap 102 as shown in FIG. 1 with arrows X. This forms cuff 107, which covers the strap 102. Cuff 107 makes it more difficult for the animal to attempt to remove the boot 100 buy chewing the strap 102. Cuff 107 also reduces the risk that strap 102 could become caught on something as the cat moves around the house.

The body 101 is made from a metal or metalized fabric or similarly puncture resistant material such as Keviar® (Poly-para-phenylene terephthalamide) mesh or nylon mesh. Such fabrics are well known. Chain mail and metal mesh are two examples. The fabric must be flexible enough to be folded down to form the cuff 107 and to allow the cat's foot to move within the boot.

Depending of the type of fabric used air holes H can be provided to ensure proper air circulation around the paw of the cat. This would not be necessary with the metal mesh fabric, but may well be required for metalized fabric. The metal mesh fabrics can be coated with any of the known in the art anti-rust coatings to increase the life of the boot 100.

Figure 4:
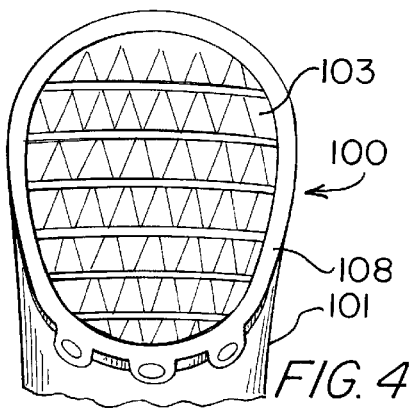
FIG. 4 is a bottom plan view of the first alternate embodiment.
Figure 5:
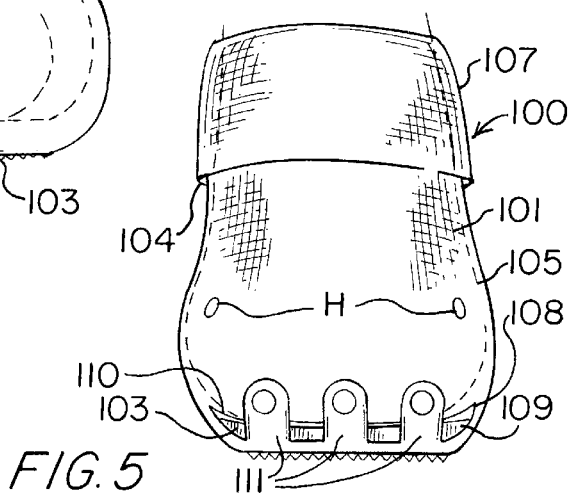
FIG. 5 is a back plan view of the first alternate embodiment.

The bottom edge 108 of the body 101 is formed into a lip 109, as shown in FIGS. 4 and 5. The sole 103 is held in place by the lip 109. The sole 103 is made from a flexible material such as plastic or rubber. The sole can be removed through opening 110 in the back of the boot 100, as shown in FIG. 5. The opening 110 is closed with snaps 111 or other known fasteners.

Figure 2:
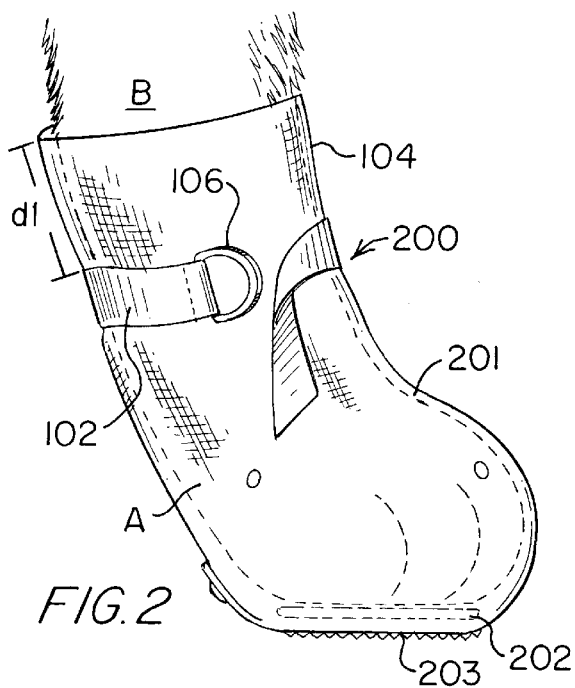
FIG. 2 is a side plan view of a second alternate embodiment with metal mesh on the bottom of the boot with the strap open.

A second alternate embodiment of the boot 200 is to form the boot 200 out of a closed sock 201 of metal mesh, as shown in FIG. 2. The top portion of the boot 200 is identical to the alternate embodiment 100. The boot 200 has rubber sole 202 inside the sock 201 for the cat's paw A to rest on. An exterior sole 203 can also be provided. The metal mesh on the bottom of the boot 200 prevents the cat from chewing through the rubber bottom of the boot.

For both of the alternate embodiments the chain mail or metal mesh would need to have rings of a small enough diameter that the cat's claws could not extend through the finished fabric.

Although the present invention has been described with reference to preferred embodiments, numerous modifications and variations can be made and still the result will come within the scope of the invention. No limitation with respect to the specific embodiments disclosed herein is intended or should be inferred.

I claim:

1. An animal boot made from puncture resistant mesh comprising:

a tube having a top end and a bottom end wherein said bottomed is outwardly flared;

a sole removably attached to said bottom end;

a strap attached to the tube a given distance from the top end;

said strap having a fastener to allow the boot to be secured to the animal's leg;

a lip around a perimeter of the bottom end forming a retaining space;

a slot extending through said lip; and the sole shaped to fit through said slot and rest inside said retaining space.

2. The animal boot of claim 1, wherein the puncture resistant mesh is made from metal.

3. The animal boot of claim 1, wherein the puncture resistant mesh is made from Teflon.

4. The animal boot of claim 1, wherein the fastener is a D-ring buckle.

5. The animal boot of claim 1 wherein the sole further comprises a textured surface functioning to provide traction for the animal.

6. An animal boot made from puncture resistant material comprising:

a substantially rigid, hollow, foot piece shaped to receive an animal paw, said foot piece having a top edge, an inner surface, an outer surface and a bottom surface;

a tubular middle section having a top and a bottom edge and a tubular top section having a top and a bottom edge, said tubular sections being of sufficient internal diameter to fit around an animal leg above the paw;

said bottom edge of said tubular middle section being attached to the top edge of said foot piece and said tubular middle section extending upward a given distance, said bottom edge of said tubular top section being attached to said top edge of said tubular middle section;

a strap attached to the tubular top section a given distance from the top edge;

said strap having a fastener to allow the boot to be secured to the animal's leg;

a lip around a perimeter of the bottom surface of said foot piece forming a cavity;

a slot extending through said lip; and a sole shaped to fit through said slot and rest in said cavity, said pad functioning to improve traction.

7. The animal boot of claim 6 further comprising a pad attached to said inner surface of the foot piece functioning to protect the animal's foot.

8. The animal boot of claim 6, wherein the foot piece is made from metal.

9. The animal boot of claim 6, wherein the tubular middle section is made from chain mail.

10. The animal boot of claim 6, wherein the tubular top section is made from plate and ring material.

11. The animal boot of claim 6, wherein the boot is formed of Kevlar®.

12. The animal boot of claim 6 further comprising:

a first piece of the fastener attached to the top edge of the tubular top section;

a second piece of the fastener attached to the boot below the strap, said fastener functioning to allow the tubular section to be folded down over the strap to prevent the animal from chewing the strap.

* * * * *